US008159618B2

(12) United States Patent
Fan Chiang et al.

(10) Patent No.: US 8,159,618 B2
(45) Date of Patent: Apr. 17, 2012

(54) METHOD FOR SEARCHING SIGNAL SOURCE AND ARRANGING SIGNAL TERMINALS ACCORDING TO DETECTED SIGNAL SOURCE

(75) Inventors: Chih-Heng Fan Chiang, Hsinchu (TW); Wen-Chang Chien, Hsinchu (TW); Hsin-Chi Chen, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 1344 days.

(21) Appl. No.: 11/761,379

(22) Filed: Jun. 12, 2007

(65) Prior Publication Data

US 2008/0022019 A1    Jan. 24, 2008

(30) Foreign Application Priority Data

Jul. 20, 2006 (TW) ................................ 95126497 A

(51) Int. Cl.
 *H04N 5/268* (2006.01)
(52) U.S. Cl. ........ 348/706; 348/554; 348/555; 348/556; 348/558; 348/180; 348/725; 348/726; 348/727; 348/728; 348/729; 348/731; 348/705
(58) Field of Classification Search .................. 348/555, 348/558, 556, 570, 729, 725, 726, 727, 728, 348/705, 554, 731, 180
See application file for complete search history.

(56) References Cited

U.S. PATENT DOCUMENTS

| 5,572,263 | A | 11/1996 | Kim et al. | |
|---|---|---|---|---|
| 6,731,347 | B1 * | 5/2004 | Takano et al. | 348/558 |
| 6,826,776 | B1 * | 11/2004 | Takano et al. | 725/80 |
| 2003/0147013 | A1 * | 8/2003 | Martin | 348/706 |
| 2004/0160531 | A1 * | 8/2004 | Takano et al. | 348/558 |
| 2004/0186922 | A1 * | 9/2004 | Takano et al. | 710/1 |
| 2006/0015911 | A1 * | 1/2006 | Dean | 725/74 |
| 2006/0143679 | A1 * | 6/2006 | Yamada et al. | 725/131 |
| 2007/0022464 | A1 * | 1/2007 | Dean | 725/136 |
| 2007/0121010 | A1 * | 5/2007 | Sasaki | 348/558 |

FOREIGN PATENT DOCUMENTS

| JP | 2001-255861 | * | 9/2001 |
|---|---|---|---|
| TW | 592422 | | 6/2004 |
| TW | I257254 | | 6/2006 |

* cited by examiner

*Primary Examiner* — Jefferey Harold
*Assistant Examiner* — Sam Huang
(74) *Attorney, Agent, or Firm* — Jianq Chyun IP Office

(57) ABSTRACT

A method for searching a signal source suitable for a multimedia apparatus with multiple signal terminals is disclosed. The method provides an ordered search list of the signal terminals to save the search sequence of the signal terminals. The multimedia apparatus sequentially detects the signal terminals according to the ordered search list of the signal terminals to identify whether an input signal is available. When a specific signal terminal of the signal terminals is found to have an input signal, the sequence of the specific signal terminal in the ordered search list of the signal terminals is set as the first sequence position.

8 Claims, 3 Drawing Sheets

METHOD FOR SEARCHING SIGNAL SOURCE AND ARRANGING SIGNAL TERMINALS ACCORDING TO DETECTED SIGNAL SOURCE

CROSS-REFERENCE TO RELATED APPLICATION

This application claims the priority benefit of Taiwan application serial no. 95126497, filed Jul. 20, 2006. All disclosure of the Taiwan application is incorporated herein by reference.

BACKGROUND OF THE INVENTION

1. Field of the Invention

The present invention relates to a method for searching a signal source, and more particularly, to a method for searching an input signal in signal terminals.

2. Description of the Related Art

The progress of multimedia apparatuses (for example, a digital television, a projection system and a TV tuner) and the demand on the high image quality thereof make a multimedia apparatus need to equip with diverse signal terminals so as to be capable of inputting audio and video signals (AV signals) in a variety of formats.

As a multimedia apparatus is turned on, it usually needs some time to search and determine which signal terminal gets an input signal and what signal format the available input signal belongs to. Referring to FIG. 1, to do the job, a fixed search sequence is used in the prior art, for example, beginning with a digital visual interface (DVI) connector, then, an RCA connector, a Composite connector and ending at a Scart connector. When a user starts up a multimedia apparatus or presses down a search key, the multimedia apparatus follows the specified search sequence to sequentially search a signal source (step S110). Wherein, the DVI connector is detected at first to identify whether an input signal is available thereat (step S120). If input signal is found at the DVI connector, the input signal is analyzed and decoded (step S130) and the procedure to search a signal source is ended. If no input signal is found at the DVI connector, the search continues to the RCA connector to decide whether an input signal is available thereat (step S140). According to the search pattern, it continues to the following the steps S150-S195 to search the signal source input to the multimedia apparatus.

If the terminal often used by a user is the one taking the last sequence position in the search sequence (for example, the Scart connector), or the user needs to switch two or more than two terminals for using the multimedia apparatus, the search procedure must begin with the DVI connector, followed by sequentially detecting all the successive terminals to locate the terminal with an input signal, which incur lengthy search time to complete the job. In addition, while the multimedia apparatus is receiving a signal and displaying an image through the RCA connector, if the format of the input signal at the RCA connector is suddenly changed, for example, from 480i signal format to 1080i signal format (it often happens, for example, switching the TV channels), the search procedure runs again for detecting all the terminals to retrieve the signal in 1080i format at the RCA connector, because there is no signal at all at the RCA connector at that point the signal format gets switched. Therefore, such a situation briefly interrupts the viewing image when the user is using the multimedia apparatus.

SUMMARY OF THE INVENTION

The objective of the present invention is to provide a method for searching a signal source by using an ordered search list of the signal terminals capable of quickly search the signal source and avoid conducting unnecessary steps and detecting unnecessary signal terminals.

To achieve the above-described or other objectives, the present invention provides a method for searching a signal source suitable for a multimedia apparatus with multiple signal terminals. First, an ordered search list of the signal terminals is provided, wherein the search sequence of all the signal terminals is saved in the ordered search list of the signal terminals. Next, every signal terminal is sequentially scanned to identify whether an input signal is available thereat according to the ordered search list of the signal terminals. Finally, when a specific signal terminal among all the terminals is identified to have an input signal, the specific signal terminal is set as the first specific signal terminal, and the sequence position of the first specific signal terminal is set as the first sequence position in the ordered search list of the signal terminals.

The present invention uses an ordered search list of the signal terminals and an ordered search list of the signal formats for searching a signal source in a multimedia apparatus, wherein the often used signal terminals and signal formats by the user are set to have the priority for shortening the search time. On the other hand, in response to switch a signal terminal from one to another, the multimedia apparatus only detects the two signal terminal involved in the switching, so that the multimedia apparatus is able to quickly search the signal source and shorten the waiting time spent for searching the signal source.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
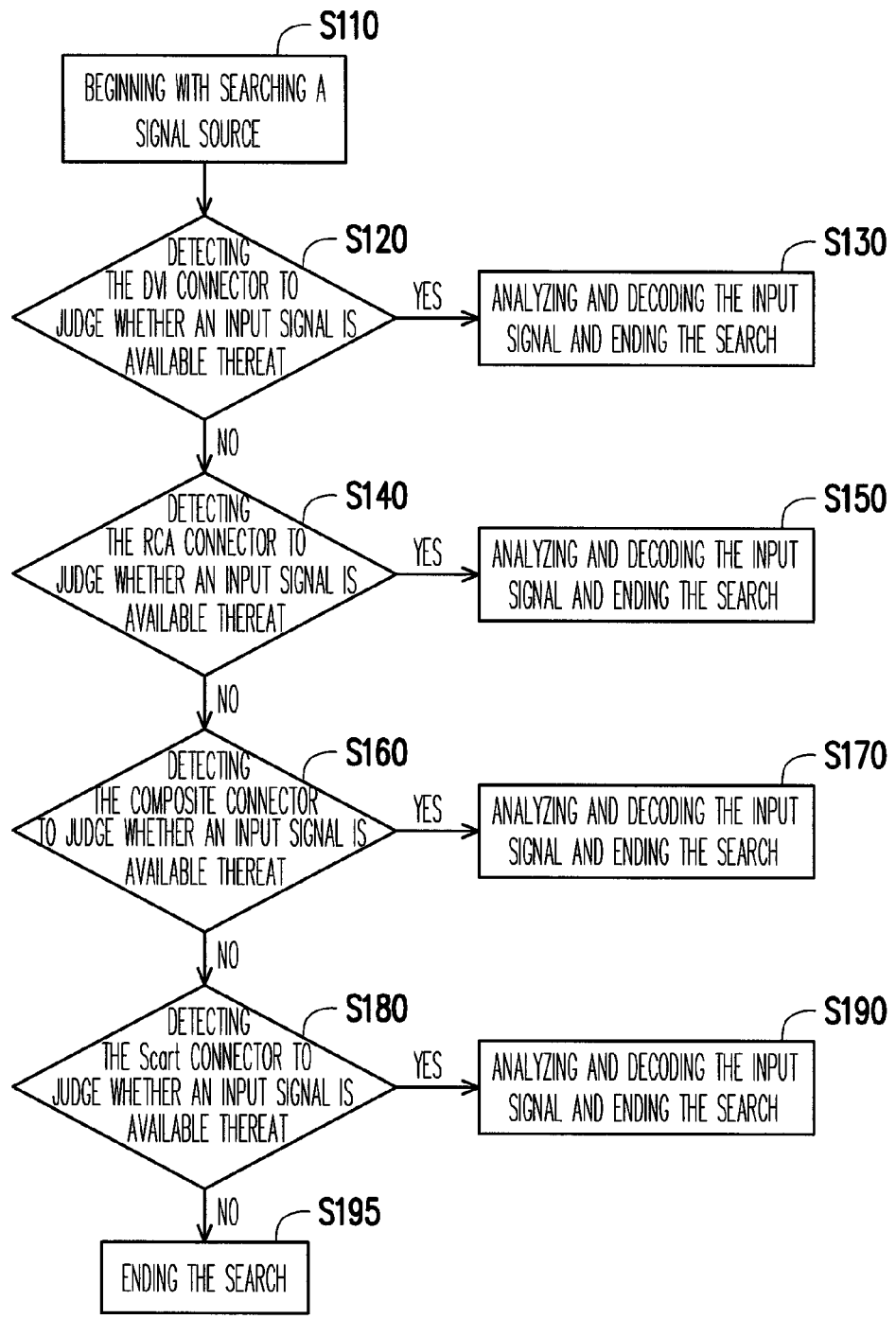
FIG. 1 is a flowchart of a conventional method for searching a signal source.
Figure 2:
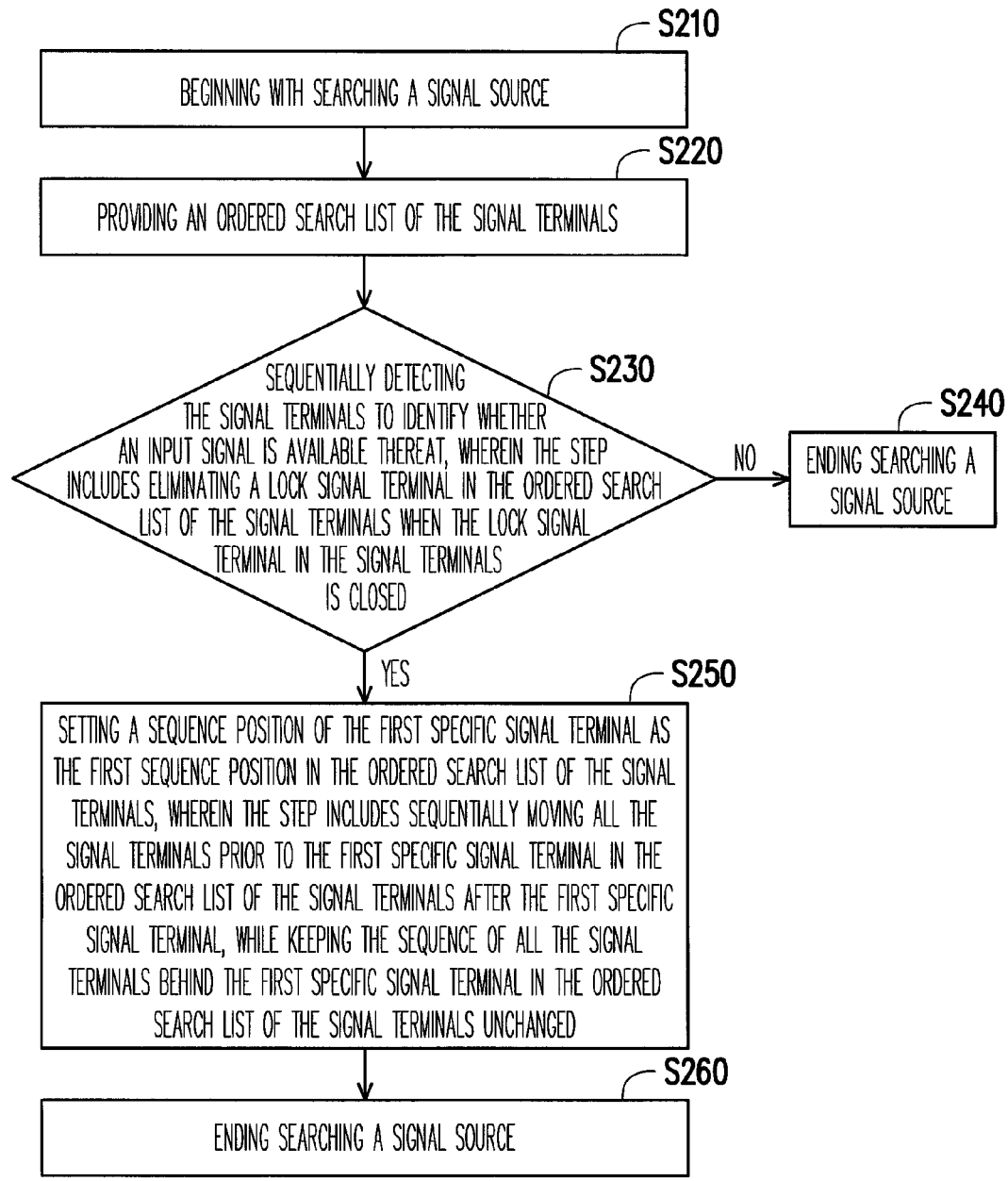
FIG. 2 is a flowchart of a method for searching a signal source according to an embodiment of the present invention.

Referring to FIG. 2, the method for searching a signal source according to an embodiment of the present invention is suitable for a multimedia apparatus with multiple signal terminals, for example but not limited to a projection system, a digital television, a TV tuner and so on. First, as a user turns on a multimedia apparatus or presses down a search key, the multimedia apparatus starts to search a signal source (step S210). Next, the multimedia apparatus provides an ordered search list of the signal terminals (step S220) where the search sequence of the signal terminals is saved. In the embodiment, it is assumed that the multimedia apparatus has a DVI connector, an RCA connector, a Composite connector and a Scart connector, and the search sequence of all the signal terminals in the ordered search list begins with the DVI connector, then, the RCA connector, the Composite connector and ends at the Scart connector. The ordered search list of the signal terminals can be saved in a memory of the multimedia apparatus in advance; thus, to get the search sequence for all the signal terminals, the multimedia apparatus needs to only read the ordered search list of the signal terminals in the memory.

Afterwards, the multimedia apparatus sequentially detects the signal terminals according to the ordered search list of the signal terminals to identify whether an input signal is available thereat (step S230). In the embodiment, it is assumed that the Scart connector in the multimedia apparatus has an input signal. Therefore, in order to find out that there is an input signal at the Scart connector, the DVI connector, the RCA connector, the Composite connector and the Scart connector are sequentially detected in accordance with the search sequence of each signal terminal in the ordered search list. That is, the search procedure is ended at the Scart connector, where an input signal is available.

If no input signal at all the terminals is found by the multimedia apparatus in step S230, the procedure for searching a signal source is either directly ended (step S240) or optionally continued to repeat step S230 once more for searching the signal source.

Finally, when one of the signal terminals is found that it has an input signal, the step is setting the signal terminal as the first specific signal terminal and setting the sequence position of the first specific signal terminal as the first sequence position in the ordered search list of the signal terminals (step S250) and the procedure for searching a signal source is ended (step S260). In the embodiment, the first specific signal terminal is the Scart connector, which is set to take the first sequence position in the ordered search list of the signal terminals in step S250. Accordingly, the search sequence in the ordered search list of the signal terminals is updated beginning with the Scart connector, then, the DVI connector, the RCA connector and ending at the Composite connector. That is to say, all the signal terminals originally prior to the first specific signal terminal in the ordered search list of the signal terminals are moved after the first specific signal terminal, while the sequence of all the signal terminals originally behind the first specific signal terminal is unchanged.

It is noted from the above-described embodiment that although the Scart connector originally takes the last sequence position in the ordered search list of the signal terminals, but it is changed to take the first sequence position once it is used, which benefits the next time usage for reducing the time to search a signal source where the Scart connector has an input signal again. In other words, if the often used signal terminal by the user is Scart connector, the multimedia apparatus searches the Scart connector first each time to start up the multimedia apparatus, so as to save time for detecting the other signal terminals.

Although the multimedia apparatus in the embodiment is equipped with only four signal terminals, however, those skilled in the art would understand that a multimedia apparatus can be further equipped with other signal terminals, for example, a high-definition multimedia interface (HDMI) connector, an separate video (S-video) connector, a D-sub-miniature (D-sub) connector and so on. By using the conventional scheme however, the more the number of the signal terminals a multimedia apparatus includes, the longer the search time needs for locating the signal terminal with an input signal will be. However, by using the method for searching a signal source of the above-described embodiment of the present invention, after the multimedia apparatus is used for a period of time, the signal terminals often used by the user takes the leading sequence positions in the ordered search list of the signal terminals; thus, when the multimedia apparatus searching a signal source every time in future, the signal terminals occupying the leading sequence positions are scanned at first, which results in a less time for searching a signal source than the conventional scheme.

It is noted that although the present embodiment has provided an exemplary method for searching a signal source in a multimedia apparatus, but it does not limit the scope of the present invention. In fact, the above-described method can be modified to various multimedia apparatus designs made by the manufactures without departing from the spirit of the present invention. For example, if the sequence position of a signal terminal used by the user gets advanced for the next time searching, it also falls within the scopes of the present invention. In the following, another embodiment of the present invention is described.

Figure 3:
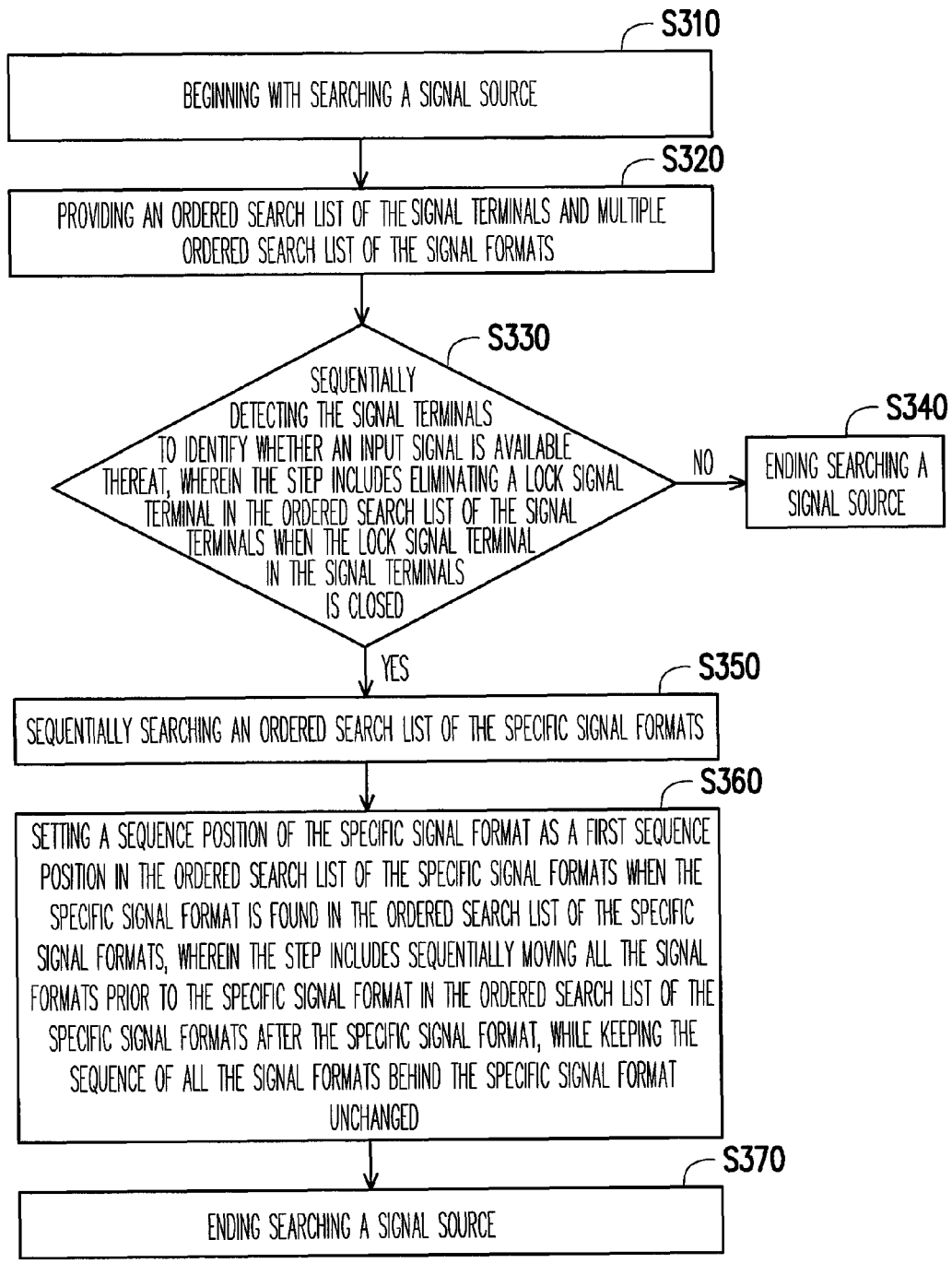
FIG. 3 is a flowchart of a method for searching a signal source according to another embodiment of the present invention.

Referring to FIG. 3, a flowchart of a method for searching a signal source suitable for a multimedia apparatus with multiple signal terminals according to another embodiment of the present invention is described, wherein the input signal of each the signal terminal possesses at least a signal format. First, the multimedia apparatus starts to search a signal source whenever the user turns on the multimedia apparatus or presses down a search key (step S310). Next, the multimedia apparatus provides an ordered search list of the signal terminals and a plurality of ordered search lists of the signal formats (step S320), wherein the search sequence of each the signal terminal and the search sequence of the related signal formats are respectively saved in the ordered search list of the signal terminals and the ordered search lists of the signal formats, and each signal terminal corresponds to an ordered search list of the signal formats. In the embodiment, it is assumed that the multimedia apparatus has a DVI connector, an RCA connector, a Composite connector and a S-video connector, and the search sequence of all the signal terminals provided by the ordered search list of the signal terminals in step S320, for example, begins with the S-video connector, then, the RCA connector, the DVI connector and ends at the Composite connector. In addition, an ordered search list of the signal formats corresponding to each the signal terminal is provided. For example, the RCA connector contains high-definition television (HDTV) format (for example, 720p, 1080i and so on, wherein 720p represents 720 progressive format as a digital video resolution, while 1080i represents 1080 interlaced format as another digital video resolution) and standard-definition television (SDTV) format (for example, 480p, 625i and so on). Thus, in the step S320, the search sequence of the signal formats provided by the ordered search list of the signal formats corresponding to the RCA connector can be, for example, SDTV and then HDTV.

It is clear that some of signal terminals (for example, Composite connector, S-video connector and so on) may use the input signal containing only one signal format, and accordingly, in the corresponding ordered search list of the signal formats only a signal format remains. Thus, according to the embodiment of the present invention, for those signal terminals requiring only one signal format, the multimedia apparatus can optionally provide the ordered search list of the signal formats to them.

Afterwards, the signal terminals are sequentially detected to identify whether an input signal is available thereat according to the ordered search list of the signal terminals (step S330). In the embodiment, a second specific signal terminal among the signal terminals is equipped with, for example, a detecting pin electrically connected to a detecting module in the multimedia apparatus. Once the detecting module detects that the electric potential at the detecting pin exceeds a predetermined potential, it is identified that the second specific signal terminal has a signal input to the multimedia apparatus. For example, a DVI connector or a high-definition multimedia interface (HDMI) connector available on the market is equipped with a hot-plug detecting pin. When the detecting module of the multimedia apparatus detects that the hot-plug detecting pin in the DVI connector has a potential larger than a predetermined potential (for example, 3V), the multimedia apparatus identifies that the DVI connector has a signal input.

In the embodiment, the multimedia apparatus can use a so-called locking function to close one of the signal terminals, and the closed signal terminal is termed as a lock signal terminal. The lock signal terminal is removed from the ordered search list of the signal terminals. Thus, during scanning the signal terminals in step S330, the lock signal terminal is skipped to shorten the time for the multimedia apparatus to search a signal source. For example, if the RCA connector is the lock signal terminal, during the process of sequentially detecting the signal terminals to find a signal terminal with an input signal in step S330, the multimedia apparatus skips the RCA connector after searching the S-video connector, followed by directly coming to the DVI connector. In the embodiment, a user can directly set a signal terminal as the lock signal terminal by using the source lock function provided by 'on screen display'. In step S330, the user can also directly select some signal terminals for the multimedia apparatus to visit, so as to narrow the detecting range and further shorten the time for searching a signal source.

In step S330, if non of the signal terminals in the multimedia apparatus is found to have a signal input, the procedure for searching a signal source is ended (step S340), or the multimedia apparatus can optionally repeat step S330 once more for searching the signal source anew.

On the contrary, when the multimedia apparatus finds a first specific signal terminal in all the signal terminals has an input signal in step S330, it is sequentially searching an ordered search list of the specific signal formats corresponding to the first specific signal terminal according to a specific signal format of the input signal (step S350). In the embodiment, if the DVI connector is detected to have an input signal, the DVI connector is defined as the first specific signal terminal. The input signal of the DVI connector can include, for example, DVI-analog signal format, DVI-digital signal format, Component signal format, Scart signal format and so on. The search sequence of all the signal formats provided by the ordered search list of the specific signal formats is that, for example, beginning with DVI-digital signal format, then, Component signal format, DVI-analog signal format and ending at Scart signal format. In step S350, the input signal of the DVI connector is sequentially identified that whether the input signal of that belongs to a signal format in the ordered search list of the specific signal formats.

For a signal terminal without a detecting pin (for example, an RCA connector, an S-video connector, a D-sub connector and so on), it is understood by those skilled in the art that the multimedia apparatus can directly use the ordered search list of the signal formats to sequentially analyze the input signal at a signal terminal and identify whether the input signal thereof belongs to a signal format in the ordered search list of the specific signal formats. For example, when the multimedia apparatus needs to identify whether the RCA connector has an input signal, the ordered search list of the signal formats can be directly used to sequentially analyze the signal at the RCA connector to identify whether the input signal thereof belongs to HDTV format or SDTV format. At this point in time, if the RCA connector only has a hot noise signal of the system or a coupling signal from the adjacent signal terminals, the multimedia apparatus finds that the signal at the RCA connector does not belong to the HDTV format or SDTV format by analyzing the signal of the RCA connector, thus, no signal input at the RCA connector is concluded.

Further, when the specific signal format is found out in the ordered search list of the specific signal formats, the ordered search list of the signal terminals and the ordered search list of the signal formats is updated (step S360), that is, the first specific signal terminal takes the first sequence position in the ordered search list of the signal terminals and the detected specific signal format takes the first sequence position in the ordered search list of the specific signal formats. Finally, the procedure for searching a signal source is ended (step S370). In the embodiment, if the DVI connector is identified to have an input signal, the sequence position of the DVI connector in the ordered search list of the signal terminals is updated to the first sequence position. That is to say, all the signal terminals originally prior to the DVI connector in the ordered search list of the signal terminals are moved behind the DVI connector, while the sequence of all of the signal terminals originally behind the DVI connector is kept unchanged. In the embodiment, therefore, the search sequence in the ordered search list of the signal terminals is updated that beginning with the DVI connector, then, the S-video connector, the RCA connector and ending at the Composite connector.

In the embodiment, if the specific signal format of the input signal at the DVI connector is DVI-analog format, the sequence position of DVI-analog format in the ordered search list of the signal formats is updated to the first sequence position and the search sequence in the ordered search list of the signal formats is updated beginning with DVI-analog format, then, DVI-digital format, Component format and ending at Scart format. That is to say, all the signal formats originally prior to DVI-analog format in the ordered search list of the signal formats are moved behind DVI-analog format, while the sequence of all the signal terminals originally behind DVI-analog format are kept unchanged.

It can be seen from the above-described embodiment that although the DVI connector originally takes the third sequence position in the ordered search list of the signal terminals, but it is changed to take the first sequence position once it is used. Similarly, although DVI-analog format originally takes the third sequence position in the ordered search list of the signal formats, but it is changed to take the first sequence position once it is used. Therefore, if the user uses the same DVI connector next time, the above-mentioned update shortens the time for searching a signal source. In the same way, if the input signal format at the DVI connector keeps the same DVI-analog format next time, the input signal is directly sent to the module charged in processing the signals in DVI-analog format in the multimedia apparatus for processing and decoding, so as to avoid spending the time for identifying the signal format. In other words, if the often used signal terminal by the user is the DVI connector with DVI-analog format, the multimedia apparatus firstly detects the DVI connector and DVI-analog format, so as to avoid spending the time for detecting the other signal terminals and analyzing the other signal formats, which benefits a user to reduce the waiting time for searching a signal source after turning on the multimedia apparatus.

In addition to the above-described advantage, the method for searching a signal source of the present invention also provides additional advantages. For example, in a situation when the multimedia apparatus is receiving an input signal in HDTV format (for example, 1080i) from the RCA connector and stably displaying the images, which implies the signal format sequence in the ordered search list of the signal formats corresponding to the RCA connector is, for example, HDTV format and, then, SDTV format. If the signal format at the RCA connector gets changed from HDTV to SDTV (for example, 480i), which is the case, for example, a change from a TV program to a commercial advertisement or switching the TV channels, then, the multimedia apparatus immediately senses the original signal in HDTV format disappeared. In response to the situation, the multimedia apparatus directly identifies the present signal at the RCA connector and decide whether the present signal belongs to SDTV format according to the signal format sequence provided by the ordered search list of the signal formats corresponding to the RCA connector. In this way, the search for a signal source once again can be avoided, which further shortens the searching time and also an image interruption on the screen. Moreover, when the signal format at the RCA connector is identified as SDTV format, the signal format sequence in the ordered search list of the signal formats is updated to SDTV format, then, HDTV format. In succession, if the signal at the RCA connector restores from SDTV format to HDTV format, which is the case, for example, the commercial advertisement is over and the original TV program is restored or switching the TV channels, then, the multimedia apparatus immediately senses the original signal in SDTV format disappeared. In response to the situation, the multimedia apparatus directly identifies the present signal at the RCA connector and decide whether the present signal belongs to HDTV format according to the signal format sequence provided by the ordered search list of the signal formats corresponding to the RCA connector.

Accordingly, the method for searching a signal source provided by the present invention has at least one or more of the following advantages:

1. During the process of searching a signal source, the multimedia apparatus has priority to choose the often used signal terminal and signal format by the user, so as to shorten the time for searching a signal source.

2. When the signal source gets switched between two signal terminals, the multimedia apparatus only targets the two signal terminals for searching, which benefits the user to save the time supposedly needed to search a signal source at other signal terminals.

3. In response to changes of signal format of the signal source, the multimedia apparatus follows the signal format sequence specified in the ordered search list of the signal formats and directly go down from the sequence position of the changed format to analyze it, which not only helps to find the correct signal format more quickly, but also avoids an image interruption on the screen.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims.

Moreover, no element and component in the present disclosure is intended to be dedicated to the public regardless of whether the element or component is explicitly recited in the following claims.

What is claimed is:

1. A method for searching a signal source in a multimedia apparatus having a plurality of signal terminals, the method comprising the steps of:

providing an ordered search list of the signal terminals in which search sequence of the signal terminals is saved;

sequentially detecting the signal terminals according to the ordered search list of the signal terminals to decide whether an input signal is available thereat, wherein the step, of sequentially detecting the signal terminals according to the ordered search list of the signal terminals to decide whether an input signal is available thereat comprises:

eliminating a lock signal terminal in the ordered search list of the signal terminals when the lock signal terminal in the signal terminals is closed;

setting a specific signal terminal as the first specific signal terminal and setting a sequence position of the first specific signal terminal as the first sequence position in the ordered search list of the signal terminals when the first specific signal terminal among the signal terminals is found to have an input signal, wherein the step of setting a sequence position of the first specific signal terminal as the first sequence position in the ordered search list of the signal terminals comprises:

sequentially moving all the signal terminals prior to the first specific signal terminal in the ordered search list of the signal terminals after the first specific signal terminal, while keeping the sequence of all the signal terminals behind the first specific signal terminal in the ordered search list of the signal terminals unchanged.

2. The method for searching a signal source as recited in claim 1, wherein the input signal of each of the signal terminals possesses at least a signal format, and the method further comprises the step of:

providing a plurality of ordered search lists of the signal formats corresponding to the signal terminals, wherein a sequence of the signal formats is saved in each of the ordered search lists of the signal formats.

3. The method for searching a signal source as recited in claim 2, further comprising the steps of:

sequentially searching an ordered search list of the specific signal formats corresponding to the first specific signal terminal according to a specific signal format of the input signal; and setting a sequence position of the specific signal format as a first sequence position in the ordered search list of the specific signal formats when the specific signal format is found in the ordered search list of the specific signal formats.

4. The method for searching a signal source as recited in claim 3, wherein the step of setting the specific signal format as the first sequence position comprises:

sequentially moving all the signal formats prior to the specific signal format in the ordered search list of the specific signal formats after the specific signal format, while keeping the sequence of all the signal formats behind the specific signal format unchanged.

5. The method for searching a signal source as recited in claim 1, wherein the signal terminals comprise at least one of a digital visual interface (DVI) connector, a high-definition multimedia interface (HDMI) connector, a separate video (S-video) connector, a Scart connector, an RCA connector and a D-sub connector.

6. The method for searching a signal source as recited in claim 1, further comprising the following step when the first specific signal terminal possesses a plurality of signal formats:

providing an ordered search list of the specific signal formats for saving a search sequence of the signal formats.

7. The method for searching a signal source as recited in claim 6, further comprising the steps of:

sequentially searching the ordered search list of the specific signal formats according to a specific signal format of the input signal; and setting a sequence position of the specific signal format as a first sequence position in the ordered search list of the specific signal formats when the specific signal format is found in the ordered search list of the specific signal formats.

8. The method for searching a signal source as recited in claim 7, wherein the step of setting a sequence position of the specific signal format as the first sequence position comprises:

sequentially moving all the signal formats prior to the specific signal format in the ordered search list of the specific signal formats after the specific signal format, while keeping the sequence of all the signal formats behind the specific signal format unchanged.

* * * * *